United States Patent
Sanchihar et al.

(10) Patent No.: US 12,217,894 B2
(45) Date of Patent: *Feb. 4, 2025

(54) ROTARY VARIABLE DIFFERENTIAL TRANSFORMER

(71) Applicant: Honeywell International Inc., Charlotte, NC (US)

(72) Inventors: Paresh Sanchihar, Bangalore (IN); Subramanian Esakki, Bangalore (IN); Vijayshekhar Araganji, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,162

(22) Filed: Jun. 13, 2023

(65) Prior Publication Data
US 2023/0326647 A1 Oct. 12, 2023

Related U.S. Application Data

(63) Continuation of application No. 16/422,005, filed on May 24, 2019, now Pat. No. 11,715,587.

(51) Int. Cl.
*H01F 27/28* (2006.01)
*G01D 5/22* (2006.01)
(Continued)

(52) U.S. Cl.
CPC .......... *H01F 21/04* (2013.01); *G01D 5/2291* (2013.01); *H01F 27/02* (2013.01); *H01F 27/28* (2013.01); *H01F 41/02* (2013.01)

(58) Field of Classification Search
CPC .......... H01F 21/04; H01F 27/02; H01F 27/28; H01F 41/02; H01F 21/065; H01F 21/06; G01D 5/2291
(Continued)

(56) References Cited

U.S. PATENT DOCUMENTS

| 2,494,493 A | 1/1950 | Schaevitz |
| 3,101,462 A | 8/1963 | Swainson |

(Continued)

FOREIGN PATENT DOCUMENTS

CN    202855523 U    4/2013

OTHER PUBLICATIONS

U.S. Appl. No. 16/422,005, filed May 24, 2019, U.S. Pat. No. 11,715,587, Issued.

(Continued)

*Primary Examiner* — Shawki S Ismail
*Assistant Examiner* — Kazi S Hossain
(74) *Attorney, Agent, or Firm* — Alston & Bird LLP

(57) ABSTRACT

A rotary variable differential transformer for measuring angular displacement and method of manufacturing the same are provided herein. The rotary variable differential transformer includes a stator configured to house a primary coil configured to receive an alternating current, a first secondary coil electromagnetically coupled to the primary coil, and a second secondary coil electromagnetically coupled to the primary coil. The rotary variable differential transformer also includes a rotor positioned concentrically within the stator. The rotor is configured to receive a shaft and rotate with the shaft while the stator remains stationary. The primary coil is positioned at a first radial position within the stator spaced between about 90 to 150 degrees from each of the first secondary coil and the second secondary coil.

10 Claims, 6 Drawing Sheets

(51) Int. Cl.
*H01F 21/04* (2006.01)
*H01F 27/02* (2006.01)
*H01F 41/02* (2006.01)

(58) Field of Classification Search
USPC .............................................. 336/40, 41, 45
See application file for complete search history.

(56) References Cited

U.S. PATENT DOCUMENTS

| | | | |
|---|---|---|---|
| 3,818,401 A | 6/1974 | Mouri et al. | |
| 3,882,436 A | 5/1975 | Chass | |
| 4,345,230 A * | 8/1982 | Chass | H01F 21/06 336/135 |
| 4,347,491 A * | 8/1982 | Chass | H01F 21/06 241/606 |
| 4,404,560 A | 9/1983 | Williams, Jr. | |
| 4,551,699 A | 11/1985 | Jong et al. | |
| 4,612,503 A * | 9/1986 | Shimizu | G01D 5/243 324/162 |
| 4,910,488 A | 3/1990 | Davis et al. | |
| 5,349,293 A * | 9/1994 | Tanaka | G01D 5/2225 324/207.16 |
| 5,701,114 A | 12/1997 | Chass | |
| 6,563,412 B2 | 5/2003 | Paris | |
| 7,307,415 B2 | 12/2007 | Seger et al. | |
| 2009/0064799 A1 | 3/2009 | Kosht et al. | |
| 2013/0313938 A1 | 11/2013 | Yamada et al. | |
| 2016/0252071 A1 | 9/2016 | Phillips et al. | |

OTHER PUBLICATIONS

Advisory Action (PTOL-303) Mailed on Feb. 28, 2023 for U.S. Appl. No. 16/422,005.
Examiner Interview Summary Record (PTOL-413) Mailed on Feb. 28, 2023 for U.S. Appl. No. 16/422,005.
Final Rejection Mailed on Dec. 8, 2022 for U.S. Appl. No. 16/422,005.
Non-Final Office Action Mailed on May 18, 2022 for U.S. Appl. No. 16/422,005.
Notice of Allowance and Fees Due (PTOL-85) Mailed on Mar. 17, 2023 for U.S. Appl. No. 16/422,005, 7 page(s).
Requirement for Restriction/Election Mailed on Feb. 9, 2022 for U.S. Appl. No. 16/422,005.

* cited by examiner

ROTARY VARIABLE DIFFERENTIAL TRANSFORMER

CROSS-REFERENCE TO RELATED APPLICATIONS

This application is a continuation of a U.S. nonprovisional Patent Application Ser. No. 16/422,005, entitled "Rotary Variable Differential Transformer" and filed on May 24, 2019, which is herein incorporated by reference in its entirety.

TECHNOLOGICAL FIELD

Embodiments of the present invention relate generally to rotary variable differential transformers and, more particularly, to the configuration of coils, as well as the geometry of a stator and a rotor within a rotary variable differential transformer.

BACKGROUND

Sensor assemblies, such as Rotary Variable Differential Transformers (RVDTs), may be used to correlate mechanical motion (e.g., rotational motion) with electrical signals (e.g., current, voltage, etc.) to provide measurements of the sensed mechanical motion. These sensors may be used in a variety of applications, such as hydraulic applications, engine systems, aerospace applications, and a variety of other environments for sensing mechanical motion. In these applications, such as in an engine control system, an RVDT may be used to determine the rotation of a shaft. Modern RVDT designs are characterized by certain drawbacks which are addressed by various embodiments discussed herein.

Modern rotary variable differential transformer (RVDT) assemblies typically have four poles configured with four primary coils and four secondary coils configured to measure the angular displacement of the rotor. Such configurations have small airgaps defined between the rotor and the stator and small stator slots configured to allow the coils to be placed into the stator, such that the coils could not be installed as a single, preassembled unit. The size of the coil, coupled with the size of the stator slots makes for difficult installation of coils and higher chance of breaking the coils due to small airgaps. Additionally, modern RVDT assemblies with four coils require excessive manufacturing time and cost due to a surplus of components. Various embodiments of the present disclosure allows for a reduction in the number of coils, an increase in the ease of coil installation, a reduction in components, and/or a more streamlined manufacturing process, while maintaining the performance and predictable characteristics of a RVDT.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a rotary variable differential transformer is provided for measuring angular displacement of a shaft. The rotary variable differential transformer includes a stator, which houses a primary coil configured to receive an alternating current; a first secondary coil electromagnetically coupled to the primary coil; and a second secondary coil electromagnetically coupled to the primary coil. The rotary variable differential transformer also includes a rotor positioned concentrically within the stator. The rotor is configured to receive a shaft and rotate with the shaft while the stator remains stationary. The primary coil is positioned at a first radial position within the stator spaced between about 90 to 150 degrees from each of the first secondary coil and the second secondary coil.

In some embodiments, a voltage of the first secondary coil increases in an instance that the shaft rotates in a first radial direction and the voltage of the second secondary coil increases in an instance that the shaft rotates in a second radial direction. In such embodiments, the change in voltage of the first secondary coil and the second secondary coil is linearly proportional to the rotation of the shaft. In some embodiments, the change in voltage of the first secondary coil is linearly proportional to the rotation of the shaft within a range of rotation of the shaft and the change in voltage of the second secondary coil is also linearly proportional to the rotation of the shaft within the same range of rotation of the shaft.

In some embodiments, the range of rotation of the shaft is from 0 to 55 degrees in the first radial direction to 0 to 55 degrees in the second radial direction. In some embodiments, the stator is housed within an environmentally sealed housing. In some embodiments, the stator further defines a plurality of slots configured to allow the coils to be installed along the stator. In such embodiments, each of the slots on the stator are between 0.02 and 0.100 inches wide.

In some embodiments, the air gap between the rotor and the stator is 0.001 to 0.015 inches based on requirement of output.

In some embodiments, the rotor also includes a magnetically permeable arcuate section of the rotor configured around less than an entire circumference of the rotor, such that the magnetically permeable arcuate section allows for the electromagnetic coupling between the first primary coil and the secondary coils. In some embodiments, the magnetically permeable arcuate section is between about 180 to 270 degrees of the entire circumference of the rotor.

In another example embodiment, a method of manufacturing a rotary variable differential transformer for measuring angular displacement. The method includes providing a stator. The method also includes positioning a first primary coil within the stator at a first radial position; positioning a first secondary coil within the stator at a second radial position located between about 90 to about 150 degrees away from the first radial position; and positioning a second secondary coil within the stator at a third radial position located between about 90 to about 150 degrees away from the first radial position. The method further includes rotationally positioning a rotor concentrically within the stator.

In some embodiments, positioning the coils includes winding the coils and sliding the coils through a slot within the stator housing. In some embodiments, positioning the rotor further includes connecting a shaft with the rotor. In some embodiments, the method also includes electrically connecting the primary coil to receive an alternating current input. In some embodiments, the method also includes electromagnetically coupling the first secondary coil and the second secondary coil with the first primary coil.

In some embodiments, a voltage of the first secondary coil increases in an instance that the shaft rotates in a first radial direction and the voltage of the second secondary coil increase in an instance that the shaft rotates in a second radial direction. In such an embodiment, the change in voltage of the first secondary coil and the second secondary coil is linearly proportional to the rotation of the shaft.

In some embodiments, the change in voltage of the first secondary coil is linearly proportional to the rotation of the shaft within a range of rotation of the shaft and the change in voltage of the second secondary coil is also linearly proportional to the rotation of the shaft within the same range of rotation of the shaft. In some embodiments, the range of rotation of the shaft is from 0 to 55 degrees in the first radial direction to 0 to 55 degrees in the second radial direction. In some embodiments, the stator further defines a plurality of slots configured to allow the coils to be installed along the stator. In some embodiments, each of the slots on the stator are between 0.02 and 0.100 inches wide.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The sensor assembly and sensor device described and illustrated herein may refer to a RVDT system as an example application. As would be evident to one of ordinary skill in the art in light of the present disclosure, the apparatuses, systems, and methods described herein may be applicable to sensor systems of all types, configurations, sizes, and the like.

Figure 1:
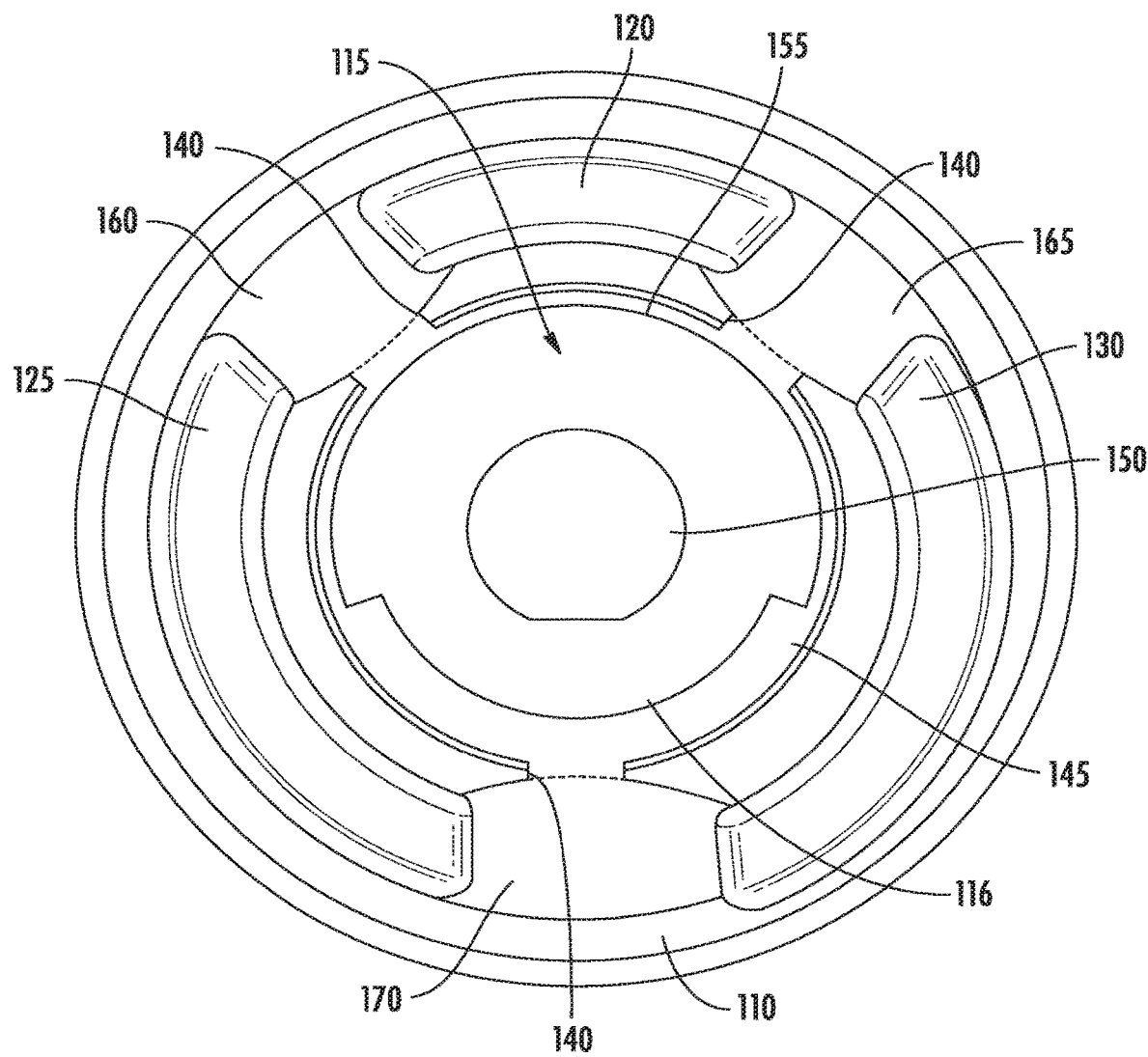
FIG. 1 is a front view of a portion of a rotary variable differential transformer in accordance with an example embodiment of the present disclosure.

With reference to FIG. 1, an example embodiment of a RVDT assembly 100 is illustrated. As shown, the RVDT assembly 100 may include a stator 110 and a rotor 115 configured concentrically within the stator. In some embodiments, the stator housing 105 may be configured to house the stator 110 and rotor 115. The stator housing 105 may be shaped generally to allow the stator 110; coils 120, 125, 130; the rotor 115, ball bearings 175, and other components of the RVDT assembly to fit within the stator housing. For example, the stator housing 105 may have a circular cross-section configured slightly larger than the stator 110. The stator housing 105 may be configured to receive a shaft 135, such that the rotor 115 may also receive the shaft. In various embodiments, the stator housing may be configured to protect the RVDT components from harsh environmental conditions.

Within the stator housing 105, the stator may be configured to receive one or more coils. For example, the stator 110 may be one or more (e.g., three) coils cavities each configured to receive a coil. In some embodiments, the stator 110 may have a plurality of stator slots 140 configured to allow the coils to be installed within the stator 110. In some embodiments, the slots may be large enough to allow the coils to be preassembled (e.g., wound) and installed in a preassembled configuration (e.g., an entire coil winding may be passed into a corresponding coil slot). In some embodiments, the number of turns of each coil may be dependent on the impedance requirements. In some embodiments, a coil may have from 100 to 300 turns. As just one non-limiting example, a coil may have 200 turns. In some embodiments, the size of the stator slot 140 may be dependent on the size (e.g., number of turns) of the coils. The stator 110 may be configured with a first primary coil 120, a first secondary coil 125, and a second secondary coil 130, such that the stator is configured with three poles. The rotor 115 of the RVDT assembly 100 may also be configured to receive a shaft 135. An example rotor 115 may have a generally circular cross-section with a magnetically permeable arcuate section 155 defining a portion of the outer circumference with a larger radius than the base portion 116, while the rotor 115 may also have a rotor opening 150 configured to receive the shaft 135. As would be evident to one of ordinary skill in the art in light of the present disclosure, movement of the rotor 115, and subsequently the shaft 135, may be determined via the differential voltage readings between the one or more coils (e.g., secondary coils 125, 130). As described hereafter with reference to the winding of the first primary coil 120 and the secondary coils 125, 130, magnetic interaction between the rotor 115 and the primary coil 120 may be electromagnetically coupled to the secondary coils 125, 130. For example, the primary coil 120 may be configured to induce a signal in the secondary coils 125, 130. This signal in the secondary coils 125, 130 may indicate an angular displacement of the rotor 115, and subsequently the shaft 135 within the stator 110. Said differently, the electrical signal of the secondary coils 125, 130 may include a phase that may correspond to a direction of the angular displacement of the rotor 115, and subsequently the shaft 135 within the stator 110 (e.g., angular displacement of the rotor 115) and an amplitude that may correspond to an angle of rotation of the rotor 115.

In some embodiments, the stator 110 and/or the rotor 115 comprise a ferromagnetic material. In some embodiments, the stator 110 and/or rotor 115 may comprise thin plates stacked together to collectively form at least a portion of the stator 110 and/or at least a portion of the rotor 115. For example, the thin plates of the stator 110 and/or rotor 115 may be laminated together. In some embodiments, coils (e.g., coils 120, 125, and 130) may be made out of copper magnetic wire. In some embodiments, the coils may be insulated. In some embodiments, the stator housing 105 and/or the shaft 135 may be made out of stainless steel.

In some embodiments, the first primary coil 120 may be positioned within a coil cavity at a first radial position (e.g., the center of the first primary coil 120 is at the first radial position) of the stator. In some embodiments, the first secondary coil 125 may be positioned within a coil cavity at a second radial position (e.g., the center of the first secondary coil 125 is at the second radial position) of the stator. In some embodiments, the second secondary coil 130 may be positioned within a coil cavity at a third radial position (e.g., the center of the second secondary coil 130 is at the third radial position) of the stator. In some embodiments, the first radial position may be 90 degrees to 150 degrees from the second radial position. In such embodiments, the voltage difference between the first secondary coil 125 and the second secondary coil 130 may be used to determine angular displacement of the rotor 115. In some embodiments, the first radial position may be 100 degrees to 140 degrees from the second radial position. In such embodiments, the extended angular distance between the primary coils 120 and secondary coils (e.g., the first secondary coil 125) allows for higher granularity in voltage changes that may be more precise determination of angular positions (e.g., high-precision angular positon determinations). As an example, the first radial position may be 110 degrees to 130 degrees from the second radial position. In some embodiments, the first radial position may be at least about 120 degrees from the second radial position. In such embodiments, the coils are evenly distributed around the rotor 115. As another example, the first radial position may be 120 degrees to 150 degrees from the second radial position. In such embodiments, the secondary coils 125, 130 are clustered together (such that the secondary coils 125, 130 are closer to one another than to the primary coil 120), such that certain implementations of the present disclosure is provided greater precision in the determination of the angular positon of the rotor 115. In some embodiments, the first radial position may be the same radial distance from the third radial position, such that the secondary coils, when installed are equi-radial distance from the primary coil 120 at the first radial position. In some embodiments, the first radial position may be 90 degrees to 150 degrees from the third radial position. In some embodiments, the first radial position may be 100 degrees to 140 degrees from the third radial position. In some embodiments, the first radial position may be 110 degrees to 130 degrees from the third radial position. In some embodiments, the first radial position may be 120 degrees from the third radial position. In some embodiments, the angular distance between the second radial position and the third radial position may be established based at least in part on the radial angle between first radial positon and the second radial position and the first radial position and the third radial position. In some embodiments, the second radial position may be 120 degrees from the third radial position. In various embodiments, the radial angle between the first radial position and second radial position, the first radial position and the third radial position, and the second radial position and the third radial position may equal 360 degrees.

In some embodiments, each of the stator slots 140 may be configured to be wide enough to allow a preassembled coil (e.g., first primary coil 120, the first secondary coil 125, and/or the second secondary coil 130) to be passed through a single stator slot for positioning within a coil cavity within the stator 110. In some embodiments, a preassembled coil may be a winding of a plurality of individual turns of wire, provided in a generally circular cylinder configuration. In some embodiments, each stator slot 140 may have a width larger than a thickness of a wire bundle forming a coil. In some embodiments, the stator slot 140 may be from 0.02 to 0.100 inches wide. As a non-limiting example, each stator slot 140 may be at least approximately 0.07 inches wide. In various embodiments, the first primary coil 120, the first secondary coil 125, and the second secondary coil 130 may be embodied as wound wire forming wire bundles. In some embodiments, the secondary coils 125, 130 may be configured to have more turns of wire than the first primary coil 120, and accordingly the thickness of the wire bundles of the secondary coils 125, 130 may exceed the thickness of the wire bundle of the first primary coil 120. In some embodiments, the first secondary coil 125 and the second secondary coil 130 may have the same number of turns of wire. In various embodiments, the number of turns of wire in the first primary coil 120, the first secondary coil 125, and/or the second secondary coil 130 may be determined based on the impedance requirements. In some embodiments, the first primary coil 120 may have a higher number of turns of wire than the first secondary coil 125 and/or the second secondary coil 130.

In some embodiments, the air gap between the rotor 115 and the stator 110 may range from 0.001 to 0.010 inches. In various embodiments, the size of the airgap between the rotor 115 and the stator 110 may be indirectly proportional to the voltage gain, such that the larger the airgap distance, the lower the voltage gain (e.g., a 0.010 inch airgap of the three pole design described herein allows for less sensitivity to horizontal misalignment between the rotor 115 and the stator 110 and/or vertical misalignment between the rotor 115 and the stator 110). In some embodiments, the size of the air gap may be reduced to enable high voltage gain.

In some embodiments, the rotor 115 may be positioned concentrically within the stator opening 145, such that the rotor 115 may rotate while the stator 110 remains stationary. In various embodiments, the rotor 115 may be configured to receive a shaft 135, such as through a rotor opening 150, such that the rotor 115 is sufficiently coupled with the shaft 135, that the rotor may freely rotate with the shaft. In some embodiments, the cross-section of the rotor 115 may be shaped in a generally circular shape with a two portions of the rotor 115 having distinct radii. For example, the rotor 115 may have a magnetically permeable arcuate section 155 having a larger radius than the base portion 116 of the rotor 115 cross-section. In various embodiments, the rotor 115 may be configured with a magnetically permeable arcuate section 155 configured with diameter slightly smaller than the stator opening such that the rotor may spin freely within the stator opening. In some embodiments, the magnetically permeable arcuate section 155 may be from about 180 to 270 degrees of the entire circumference of the rotor 115, such that about 90 to 150 degrees of the circumference is defined as the base portion 116 having a smaller radius than the magnetically permeable arcuate section 155. In some embodiments, the rotor 115 cross-sectional shape affects the magnetic flux of the RVDT 100. In some embodiments, the portion of the rotor 115 circumference that makes up the magnetically permeable arcuate section 155 is configured to change the magnetic circuit path as the magnetically permeable arcuate 155 section rotates. For example, as the magnetically permeable arcuate section 155 moves in the first radial direction towards the first secondary coil 120, the magnetically permeable arcuate section 155 creates a higher degree of magnetic coupling from the first secondary coil 120 such that the first secondary coil 120 result in a higher voltage creation and the moving of the magnetically permeable arcuate section 155 creates a lower degree of magnetic coupling with the second secondary coil 130, resulting in a lower created voltage (e.g., between the first primary coil 120 and the secondary coils 125, 130).

Figure 2:
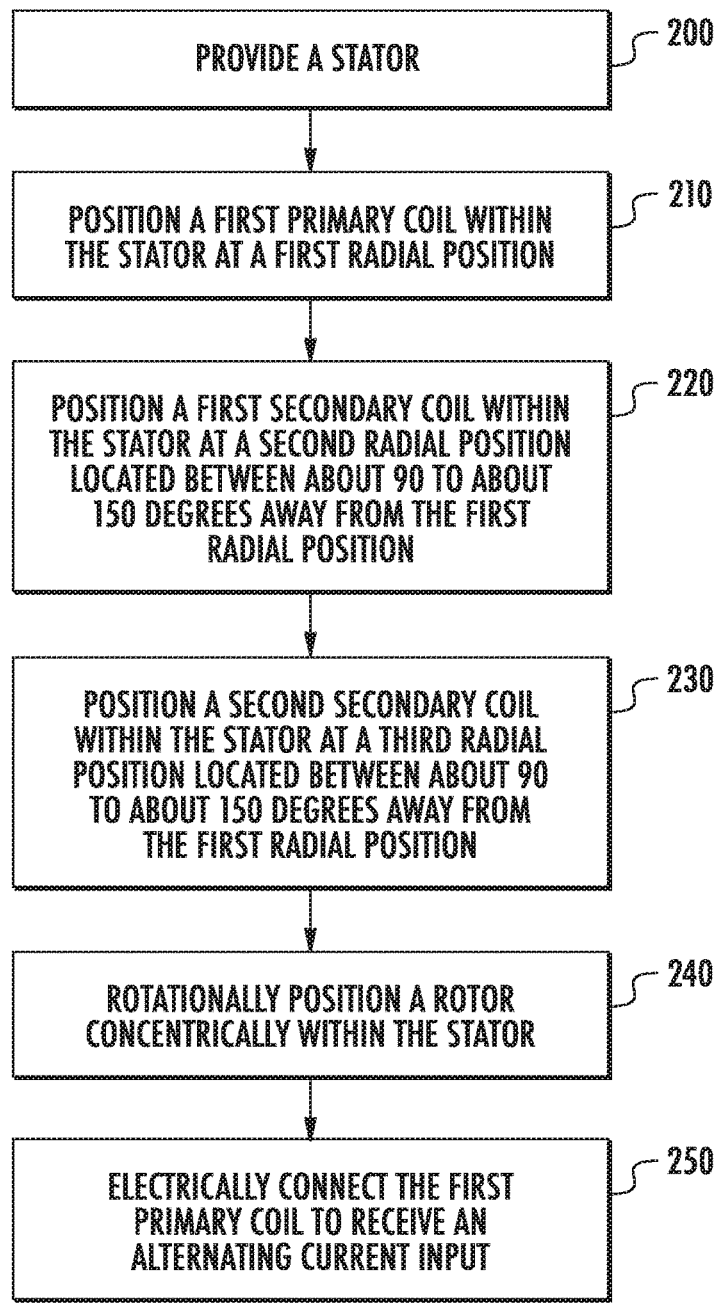
FIG. 2 is a flowchart illustrating a method of manufacturing a rotary variable differential transformer in accordance with an example embodiment of the present disclosure.

FIG. 2 illustrates a flowchart of a method of manufacturing a RVDT in accordance with an example embodiment of the present disclosure. Various embodiments of the method described may be carried out in a different order than described herein, unless explicitly stated otherwise. Additional operations may also be completed during the method of manufacturing, therefore the following steps are not exhaustive. Additionally, various operations described herein may also be performed during the operations of the RVDT.

Referring to Block 200 of FIG. 2, the method of manufacturing a RVDT 100 includes providing a stator 110. In some embodiments, as discussed herein, the stator 110 may define a circular housing defining one or more coil cavities within sidewalls of the stator housing. The coil cavities may be at least substantially enclosed within the stator housing, and may be accessible via one or more access slots defined within interior sidewalls of the stator housing. The coil cavities are configured to house at least a first primary coil 120, a first secondary coil 125, and a second secondary coil 130. In embodiments, the stator 110 may have a coil holding mechanism within the one or more coil cavities at each of the first radial position, second radial position, and third radial position, such that the respective coil may be held in place during operation. As discussed above in reference to FIG. 1, the stator 110 may have a plurality of stator slots 140 (e.g., three stator slots) configured such that a coil may be passed into the one or more coil cavities to be positioned within the stator 110.

Referring to Block 210 of FIG. 2, the method of manufacturing a RVDT 100 includes positioning a first primary coil 120 within the stator 110 at a first radial position. In some embodiments, the stator 110 may be configured to have a large enough slots 140, such that a preassembled first primary coil 120 may be placed into position through one of said slots 140. For example, positioning the first primary coil 120 (and subsequently secondary coils 125, 130) may include winding the coil outside of the stator, and sliding the wound coils through a slot 140 within the stator 110. In some embodiments, the wire turns of each coil may be bound together via binding thread or the like. In some embodiments, the coils may be configured to be inserted into the stator 110 through the stator slots 140. As discussed in more detail below in reference to Block 250, the method of manufacturing the RVDT 100 may include electrically connecting the first primary coil 120 to receive an alternating current (AC) input.

Referring to Block 220 of FIG. 2, the method of manufacturing a RVDT 100 includes positioning a first secondary coil within the stator at a second radial position located between about 90 to about 150 degrees away from the first radial position. In some embodiments, the stator 110 may be configured to have large enough slots 140 such that a preassembled first secondary coil 125 may be placed into position through one of said slots 140. In some embodiments, the assembly and positioning of the first secondary coil 125 may be substantially similar to the installation of the first primary coil 120 and/or the second secondary coil 130, described herein.

Referring to Block 230 of FIG. 2, the method of manufacturing a RVDT 100 includes positioning a second secondary coil within the stator at a third radial position located between about 90 to about 150 degrees away from the first radial position. In some embodiments, the stator 110 may be configured to have large enough slots 140 such that a preassembled second secondary coil 130 may be placed into position through one of said slots 140. In some embodiments, the assembly and positioning of the second secondary coil 130 may be substantially similar to the installation of the first primary coil 120 and/or the first secondary coil 125, described herein.

Referring to Block 240 of FIG. 2, the method of manufacturing a RVDT 100 includes positioning a rotor concentrically within the stator so as to enable free rotation of the rotor within the stator. In some embodiments, positioning the rotor 115 may include connecting a shaft 135 with rotor. For example, the rotor 115 may define a rotor opening 150 configured to rotatably receive a shaft 135, such that the rotor 115 rotates with the shaft rotation. In some embodiments, as discussed in more detail in reference to FIG. 3, one or more bearings 175 configured on each side of the rotor to receive the shaft 135 within the stator housing 105. As discussed in more detail in reference to FIG. 1, the rotor 115 may be configured with a magnetically permeable arcuate section 155 of the rotor configured around less than an entire circumference of the rotor, such that the magnetic flux flow through magnetically permeable arcuate section 155 allows for the electromagnetic coupling between the first primary coil 120 and the secondary coils 125, 130.

Referring now to Block 250 of FIG. 2, the method of manufacturing a RVDT 100 may include electrically connecting the first primary coil 120 to receive an alternating current input. In some embodiments, the RVDT 100 may be configured such that the first primary coil 120 is electrically coupled with the secondary coils 125, 130, such that the sum of the voltages between the first secondary coil 125 and the second secondary coil 130 is a constant throughout the linear range of output. In some embodiments, the RVDT 100 may be configured to monitor the change in voltage of the first secondary coil 125 and/or the second secondary coil 130. In some embodiments, the RVDT 100 may be configured to monitor the change in voltage of the first secondary coil 125 and/or the second secondary coil 130 to the ratio of sum of both voltages. In some embodiments, the secondary coils 125, 130 may be configured such that the change in voltage is linearly related to the angular rotation of the rotor 115, and subsequently the shaft 135. For example, in an instance that the shaft rotates in a first radial direction, a voltage of the first secondary coil increases (while the voltage of the second secondary coil decreases) and in an instance that the shaft rotates in a second radial direction, the voltage of the second secondary coil increases (while the voltage of the first secondary coil decreases). In some embodiments, the change in voltage of the first secondary coil 125 may be linearly proportional to the rotation of the shaft 135 within a range of rotation of the shaft and the change in voltage of the second secondary coil 130 is also linearly proportional to the rotation of the shaft within the same range of rotation of the shaft.

Figure 6:
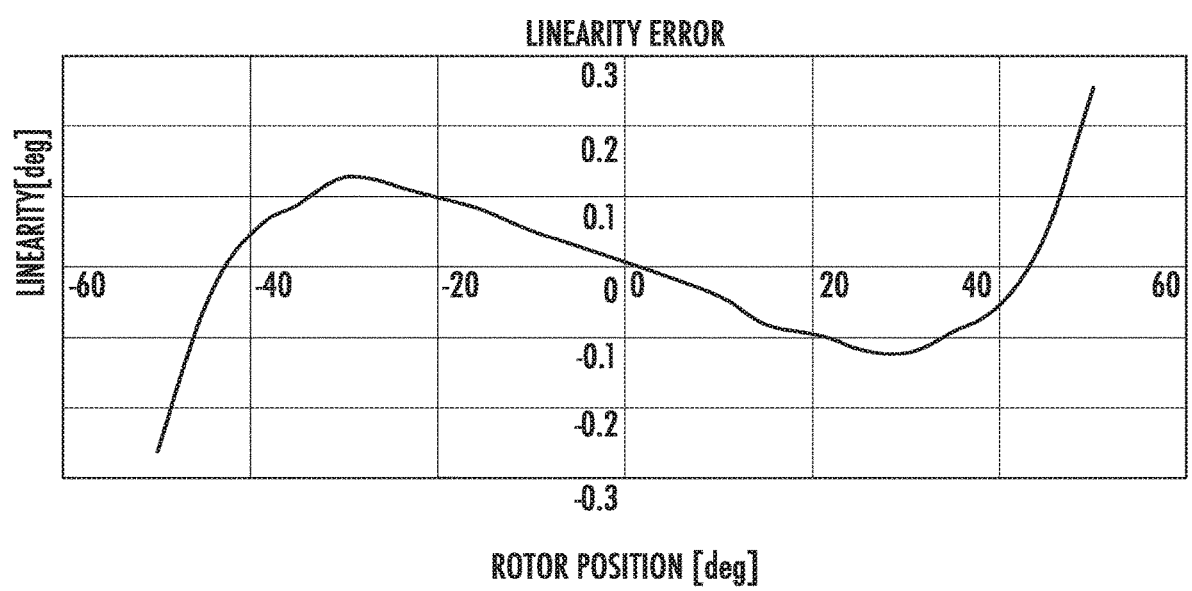
FIG. 6 is an example plot of linearity error vs. rotor position in accordance with an example embodiment of the present disclosure.

Referring briefly to FIG. 6, an example of the linearity error is shown in accordance with an example embodiment. As shown, the amount of error increases slowly as the rotor rotates farther from the center positon, in either direction, but remains relatively low (e.g., less than 0.2 degrees error) for the entire range of rotation (e.g., about 55 degrees in each direction from center). In some embodiments, the RVDT may account for error in determining the rotor position based on a similar graph. In some embodiments, the range of rotation (e.g., the angular displacement of the rotor 115) may be from zero degrees to 55 degrees in both directions (e.g., up to 55 degree range of rotation in each direction, totaling 110 degrees). In some embodiments, the range of rotation may be from zero degrees to 45 degrees in both directions (e.g., up to 45 degree range of rotation in each direction, totaling 90 degrees). In some embodiments, the range of rotation may be from zero degrees to 35 degrees in both directions (e.g., up to 35 degree range of rotation in each direction, totaling 70 degrees). In some embodiments, the range of rotation may be from zero degrees to 25 degrees in both directions (e.g., up to 25 degree range of rotation in each direction, totaling 50 degrees). In some embodiments, the voltage may only be measured at one of the secondary coils (e.g., the first secondary coil 125), such that an increase in voltage of the given secondary coil indicates that the rotor is rotating towards the given secondary coil, while a decrease in the voltage of the given secondary coil indicates that the rotor is rotating away from the given secondary coil. In some embodiments, the range of rotation may be different in each radial direction. For example, the range of rotation may be from 0 to 55 degrees in the first radial direction and 0 to 45 degrees in the second radial direction.

Figure 3:
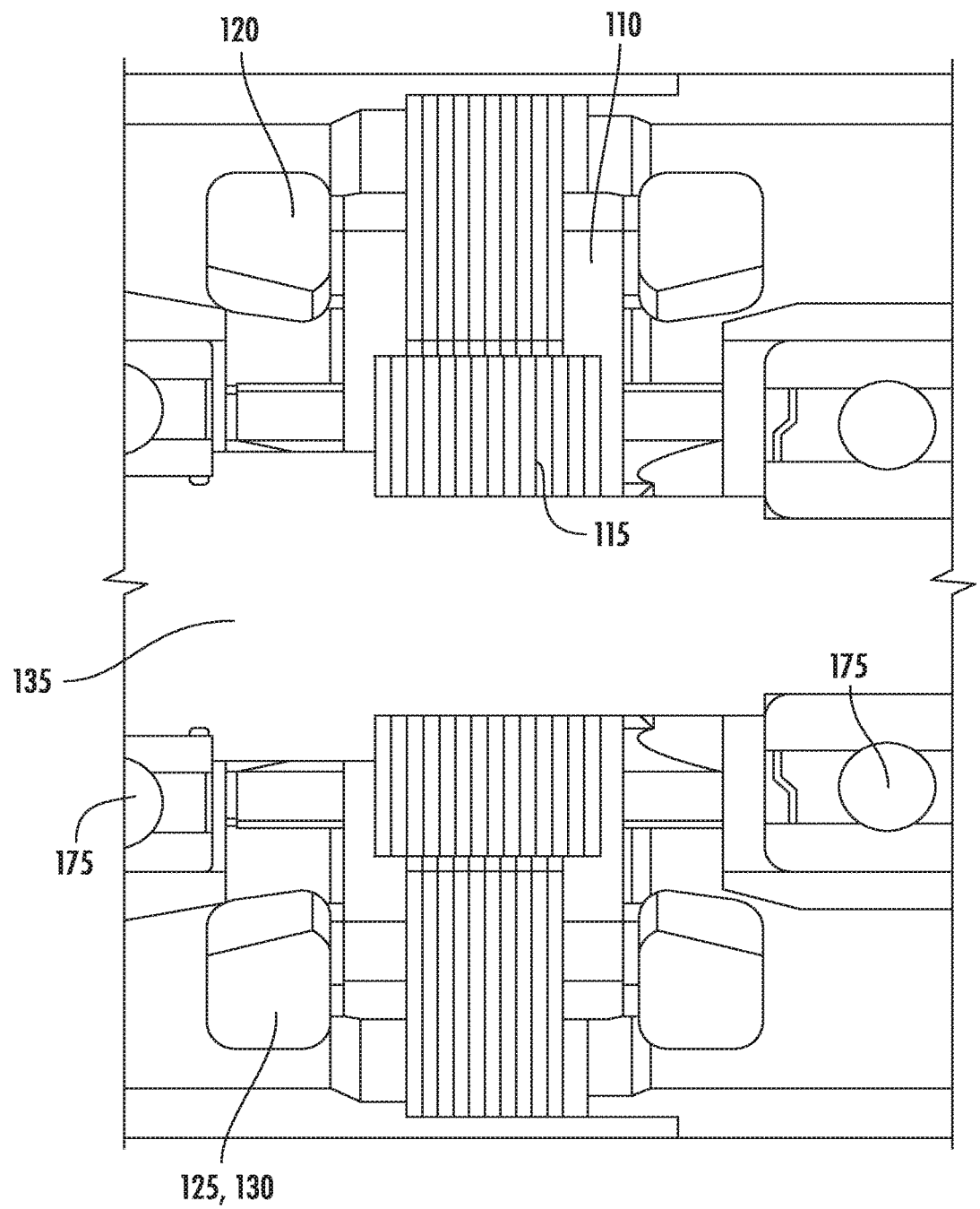
FIG. 3 is a side cutaway view of a rotary variable differential transformer in accordance with an example embodiment of the present disclosure.

As shown in FIG. 3, in some embodiments the method of manufacturing a RVDT 100 may also include providing a stator housing 105 configured to receive the stator 110, the rotor 115, and at least a portion of the shaft 135 received by the rotor 115. In various embodiments, the stator housing 105 may be configured to environmentally seal the stator 110 and rotor 115, such that the RVDT sensor 110 may be used in harsh conditions with minimal to no outside interference. In some embodiments, the stator housing 105 may be configured with a bearing (e.g., ball bearings 175) mounted to receive the shaft 135 on either side of the stator 110. In some embodiments, the housing 105 may be configured to allow the wires (not shown) to be connected to the first primary coil 120 from the alternating current input source outside of the housing 105 configured to generate a primary magnetic flux.

Figure 4:
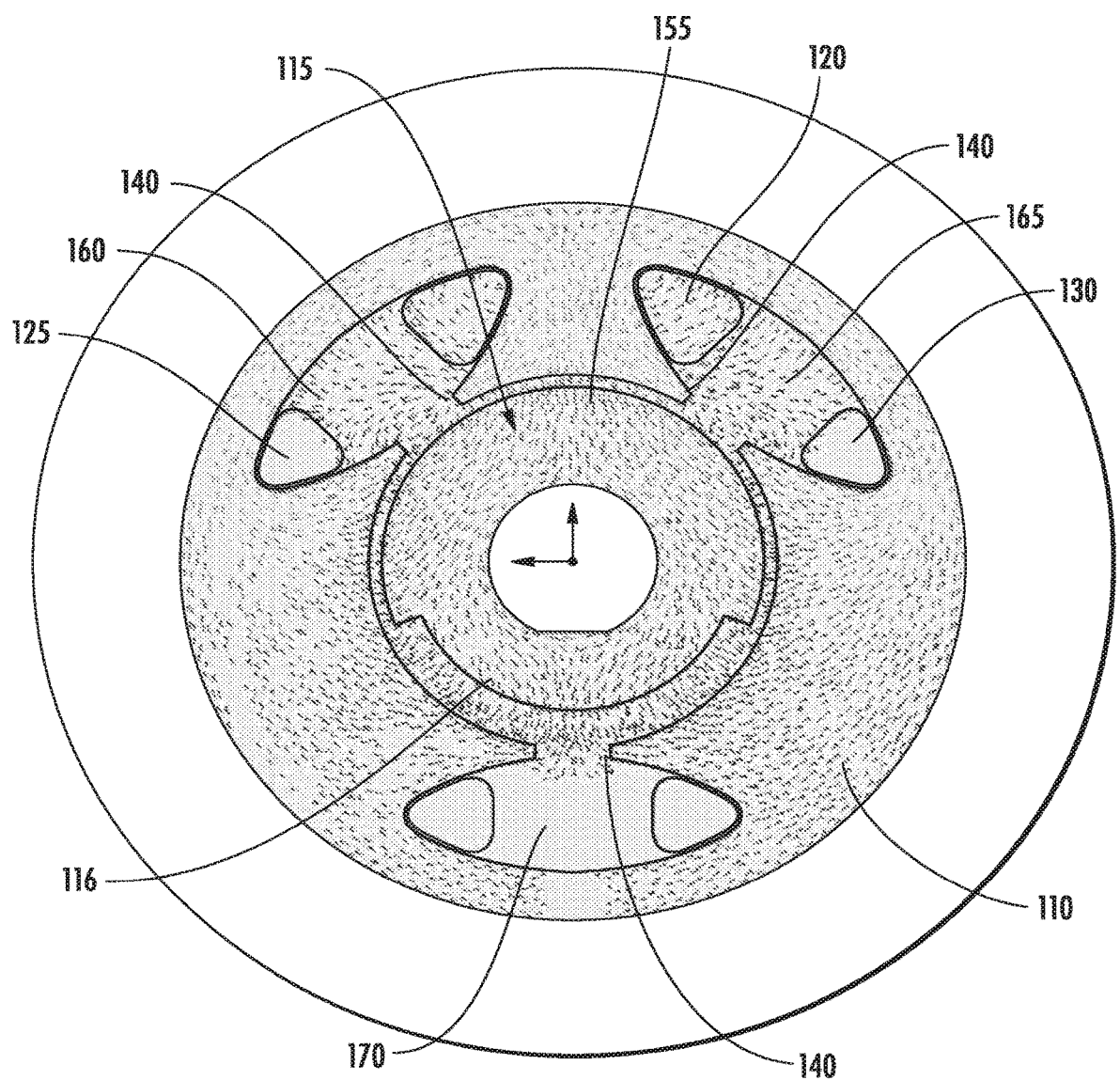
FIG. 4 is a magnetic flux chart when the rotor is positioned at the center position in accordance with an example embodiment of the present disclosure.
Figure 5:
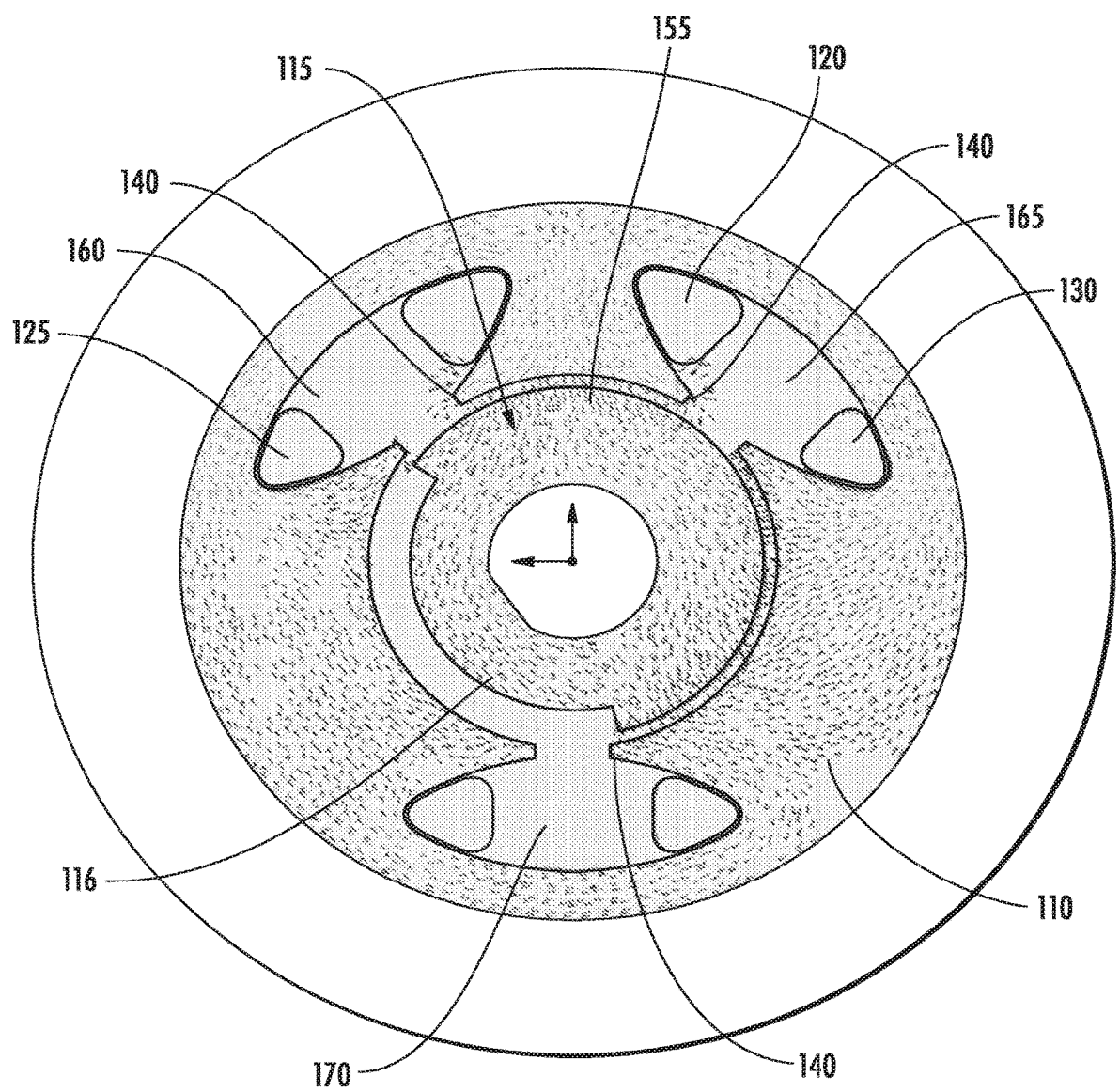
FIG. 5 is a magnetic flux chart when the rotor is rotated 40 degrees from the center positon in accordance with an example embodiment of the present disclosure.

Referring to FIGS. 4 and 5, the change in magnetic flux is shown as the rotor 115 rotates within the stator 110. FIG. 4 shows the magnetic flux at the center position, such that the electric charge of the first primary coil 120 is evenly distributed between the secondary coils 125, 130. As the shaft 135 and the rotor 115 are rotated in the clockwise direction 40 degrees (thereby rotating the magnetically permeable arcuate section 155 toward the second secondary coil 130), as shown in FIG. 5, the magnetic flux moves with the rotor such that the voltage of the second secondary coil 130 increases, while the voltage of the first secondary coil 125 decreases.

As discussed in more detail in reference to FIG. 1, the rotor 115 cross-sectional shape affects the magnetic flux of the RVDT 100. In various embodiments, the rotor 115 may be configured with a magnetically permeable arcuate section 155 configured with diameter slightly smaller than the stator opening. In some embodiments, the magnetically permeable arcuate section 155 may be from about 180 to 270 degrees of the entire circumference of the rotor 115, such that about 90 to 150 degrees of the circumference defines a base portion 116 has a smaller radius than the magnetically permeable arcuate section 155.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A rotary variable differential transformer comprising:
   a stator;
   a primary coil configured to receive an alternating current;
   a first secondary coil electromagnetically coupled to the primary coil; and
   a second secondary coil electromagnetically coupled to the primary coil;
   wherein the rotor is configured with a magnetically permeable arcuate section extending from 180 to 270 degrees of entire circumference of the rotor, such that 90 to 150 degrees of the circumference of the rotor defines a base portion having a smaller radius than the magnetically permeable arcuate section; and wherein the stator further defines an airgap between 0.001 and 0.010 inches measured between the stator and the rotor.

2. The rotary variable differential transformer of claim 1, wherein in an instance that the shaft rotates in a first radial direction, a voltage of the first secondary coil increases; and in an instance that the shaft rotates in a second radial direction, the voltage of the second secondary coil increases, wherein the change in voltage of the first secondary coil and the second secondary coil is linearly proportional to the rotation of the shaft.

3. The rotary variable differential transformer of claim 2, wherein the change in voltage of the first secondary coil is linearly proportional to the rotation of the shaft within a range of rotation of the shaft and the change in voltage of the second secondary coil is also linearly proportional to the rotation of the shaft within the same range of rotation of the shaft.

4. The rotary variable differential transformer of claim 3, wherein the range of rotation of the shaft is from 55 degrees in the first radial direction to 55 degrees in the second radial direction.

5. The rotary variable differential transformer of claim 1, wherein the stator is housed within an environmentally sealed housing.

6. The rotary variable differential transformer of claim 1, wherein the stator further defines a plurality of slots configured to allow the coils to be installed along the stator.

7. The rotary variable differential transformer of claim 6, wherein each of the slots on the stator are between 0.02 and 0.100 inches wide.

8. The rotary variable differential transformer of claim 1, wherein the rotor defines: a magnetically permeable arcuate section of the rotor configured around less than an entire circumference of the rotor, such that the magnetically permeable arcuate section allows for the electromagnetic coupling between the first primary coil and the secondary coils.

9. The rotary variable differential transformer of claim 8, wherein the magnetically permeable arcuate section is between about 180 and 270 degrees of the entire circumference of the rotor.

10. The rotary variable differential transformer of claim 1, wherein the rotary variable differential transformer is used for measuring angular displacement of a shaft.

* * * * *